(No Model.) 2 Sheets—Sheet 1.
J. J. ROYLE.
COFFEE OR TEA POT.
No. 380,521. Patented Apr. 3, 1888.
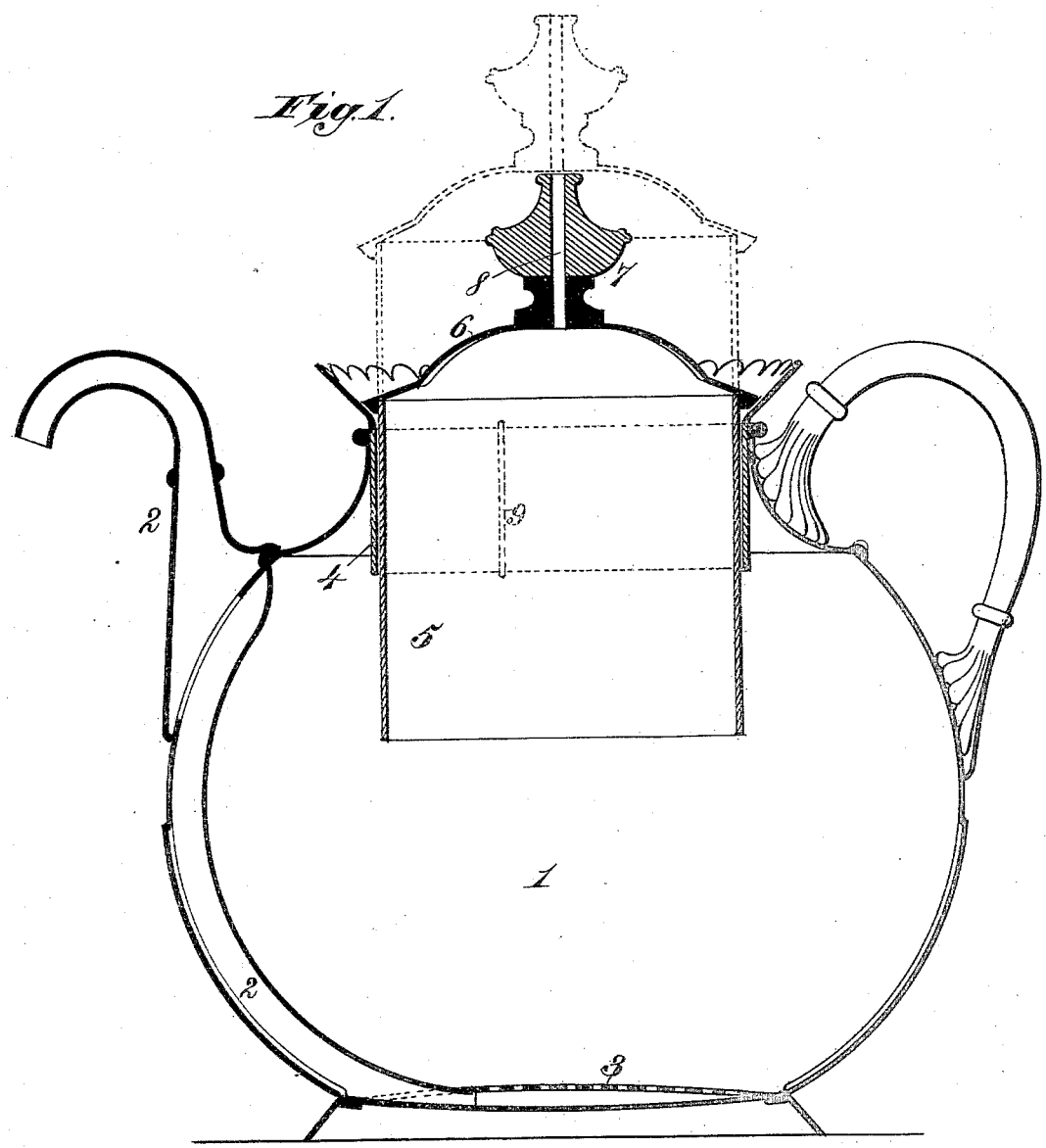
Witnesses.
Robert Errett,
Percy B. Hills.
Inventor:
John J. Royle.
By James L. Norris.
Atty.

(No Model.) 2 Sheets—Sheet 2.
J. J. ROYLE.
COFFEE OR TEA POT.
No. 380,521. Patented Apr. 3, 1888.
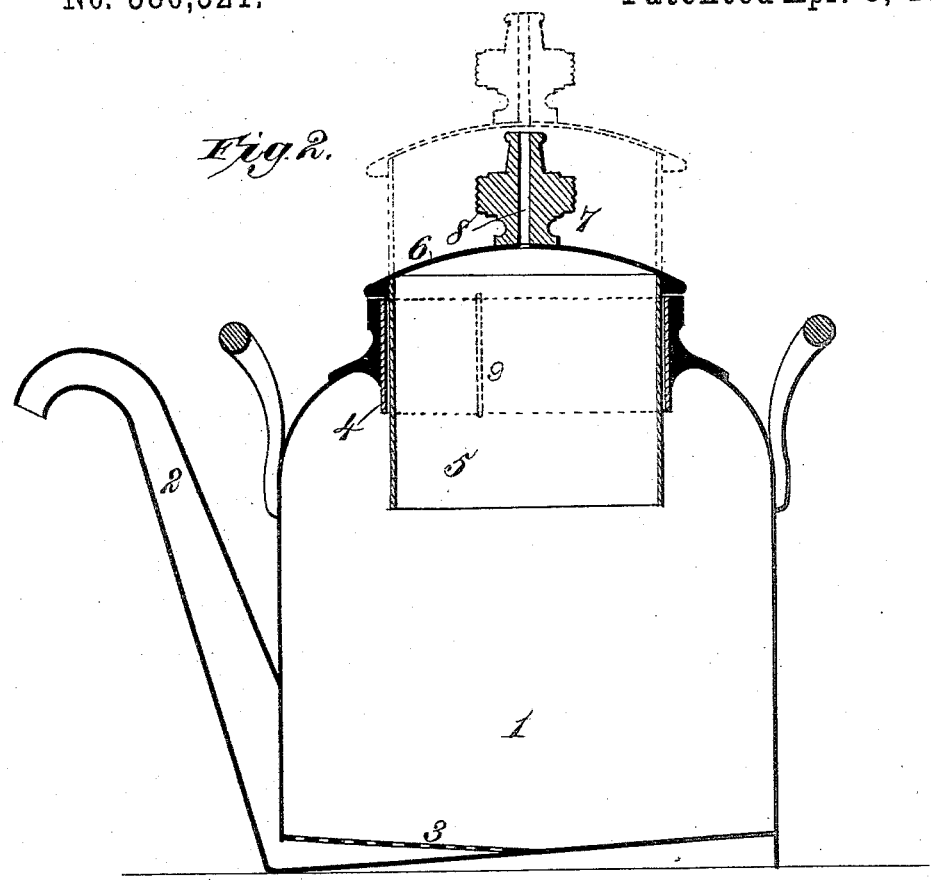
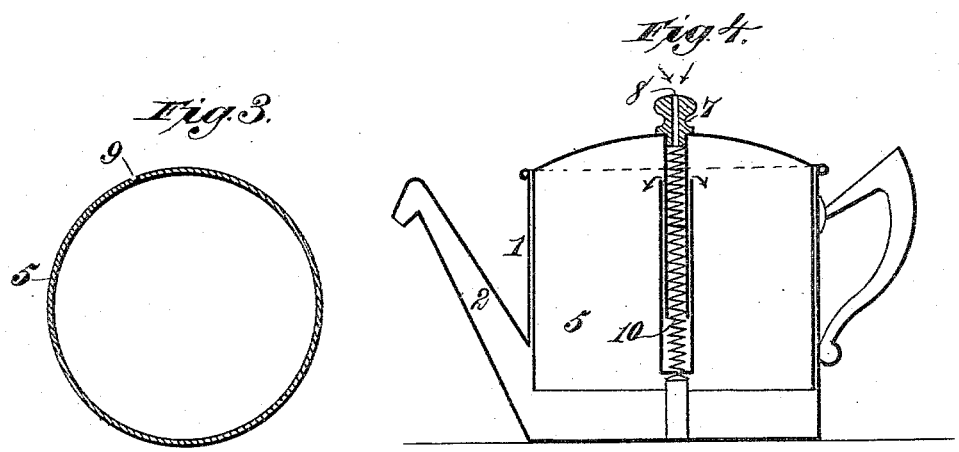
Witnesses.
Robt Pruett,
Percy B. Hills.
Inventor:
John J. Royle.
By James L. Norris.
Atty

UNITED STATES PATENT OFFICE.

JOHN JAMES ROYLE, OF MANCHESTER, COUNTY OF LANCASTER, ENGLAND.

COFFEE OR TEA POT.

SPECIFICATION forming part of Letters Patent No. 380,521, dated April 3, 1888.

Application filed October 31, 1887. Serial No. 253,889. (No model.) Patented in England May 11, 1886, No. 6,327; in France October 21, 1886, No. 179,159, and in Belgium October 22, 1886, No. 74,931.

*To all whom it may concern:*

Be it known that I, JOHN JAMES ROYLE, a subject of the Queen of Great Britain, residing at Manchester, in the county of Lancaster, England, have invented new and useful Improvements in Coffee or Tea Pots and other Liquid-Holding Vessels, (for which I have obtained patents in Great Britain, dated May 11, 1886, No. 6,327; in France, dated October 21, 1886, No. 179,159, and in Belgium, dated October 22, 1886, No. 74,931,) of which the following is a specification.

This invention has for its object to provide novel, simple, and efficient means for discharging a fluid from a vessel by the pressure of confined air above the surface of the fluid, the invention being designed for coffee or tea pots, water-pitchers, cocoa-pots, milk-jugs, toilet-bottles, and all vessels containing fluids that it is desired from time to time to discharge in desired quantities.

The invention consists, essentially, in the combination, with a vessel having a discharge-spout communicating with its bottom portion, of a vertically-movable piston working in the top of the vessel, and provided with an air orifice or passage communicating with the external atmosphere and with the air in the vessel above the surface of the liquid contained therein in such manner that by placing a finger over the said orifice to close it and then sliding the piston bodily downward the confined air in the vessel is caused to exert sufficient pressure on the fluid to cause the latter to rise in the spout and discharge therefrom.

The invention also consists of other features of construction and combination of devices, hereinafter described and claimed, reference being made to the accompanying drawings, in which—

Figure 1 is a vertical central sectional view of a fluid-containing vessel embodying my invention; Fig. 2, a similar view showing a modification in the construction of the spout and the knob or handle on the piston; Fig. 3, a horizontal sectional view of the piston; Fig. 4, a vertical sectional view of a modification.

In order to enable those skilled in the art to make and use my invention, I will now describe the same in detail, referring to the drawings, wherein—

The numeral 1 designates a vessel of any suitable form and construction for containing a fluid to be discharged through a spout, 2, which communicates with the bottom of the vessel through a perforated diaphragm, 3, though this diaphragm is not essential. The top of the vessel is provided with a stationary cylindrical casing, 4, in which is adapted to slide vertically the piston 5, having any suitably-shaped top, 6, which, in fact, constitutes the movable top of the tea-pot or other vessel. The piston is shown as a hollow cylinder with an open bottom to contain air; but I do not confine myself to this particular form of piston. The top 6 is provided with a knob or handle, 7, containing a channel or orifice, 8, which communicates at one end with the external atmosphere, so as to admit air through the piston into the vessel above the surface of the fluid therein contained. The discharge-spout 2 may be as in Fig. 1, wherein a part of it is located inside the vessel; or it may be as in Fig. 2, wherein the entire spout is outside the vessel. The knob or handle may be of any desired form or construction, but is preferably of non-conducting material; and I would here state that I do not confine myself to the air-inlet channel or orifice extending through the knob or handle.

In operation the user simply takes hold of the knob or handle and raises the piston, say, to the position indicated by dotted lines, Figs. 1 and 2, so that air is inducted into the vessel through the air-orifice and piston. The operator then places a finger over the air-inlet channel or orifice to close the same, and gently slides the piston downward, the piston sliding vertically in the top of the vessel, whereupon the pressure of the air in the vessel will cause the fluid to rise in the spout and discharge therefrom in any quantity that may be desired, say a cup or glass full. The finger is then removed from the air-orifice, and the discharge of fluid instantly ceases.

To prevent the slight discharge of the fluid incident to expansion of the air when the vessel is first filled with hot liquid, I provide a groove, 9, in the outer surface of the piston, the lower end of the groove extending just below the casing 4, and the top of the groove opening into the atmosphere, thus forming a channel of escape for any pressure.

In Fig. 4 the operation is substantially the same; but the piston or cylinder rises and falls and is guided by the walls of the interior vessel containing the coffee or other fluid, and a long spiral spring, 10, is arranged in the vessel, so that when the piston or cylinder has been depressed to force out the fluid and the piston or cylinder is released it will be automatically lifted to be again depressed. A spring of this kind can, if desired, be used in the vessels first described to automatically elevate the piston.

By my invention it is not necessary to lift and tilt the vessel to pour out the contents, and the means for effecting the discharge of the fluid are at once simple and comparatively inexpensive.

Having thus described my invention, what I claim is—

1. The combination, with a tea-pot or similar vessel having a discharge-spout on one side extending from the interior lower portion of said vessel, of a cover having a knob or handle containing an air-inlet communicating with the external atmosphere and with the interior of the vessel, and a piston attached to the cover and working in the upper part of the vessel above the fluid that may be contained therein, whereby an increased quantity of air is inducted through the cover and into the vessel on raising said cover, and a pressure exerted on the surface of the fluid to cause its discharge through the spout on closing the air-inlet and forcing the cover and piston down, substantially as described.

2. The combination of a tea-pot or similar vessel having a discharge-spout on one side extending from the interior lower portion of said vessel, a cover having a knob or handle and an air-inlet, a piston attached to the cover and working in the upper part of the vessel, and a spring to raise the piston and cover, substantially as and for the purpose described.

3. The combination, with a tea-pot or similar vessel having a spout extending from the interior lower portion of the same upward upon one side thereof and terminating in an open external discharge-orifice, and also having an internal cylindrical portion extending downwardly from its open upper end, of the vertically-movable cover 6, provided with the air-passage 8 through it, and knob 7, and a cylindrical piston attached to and projecting downward from said cover, fitting substantially air-tight in the cylindrical portion of the vessel and arranged to move up and down above the liquid contained therein, substantially as described.

4. The combination, in a pot for holding liquids, of a discharge-spout leading from the lower part of its interior upward and outward upon one side thereof, and having its discharge end carried above the interior of the pot and thence curved over and downward and adapted to discharge liquid into an open vessel while the pot stands upon its base, a plunger attached to the cover of said pot and fitted to a tubular bore within the same snugly and adapted to force the fluid out through the spout by vertical movement, and an air-inlet into the pot above the surface of the liquid adapted to be left open to allow said plunger to be raised and to be covered when said plunger is lowered to prevent escape of the contents except through the spout, substantially as described.

In testimony whereof I affix my signature in presence of two witnesses.

JOHN JAMES ROYLE.

Witnesses:
JOHN G. WILSON,
JOHN SLATER.